Feb. 2, 1943.  S. H. McALLISTER ET AL  2,309,650
CONDENSATION OF CARBONYLIC COMPOUNDS
Filed Feb. 12, 1940
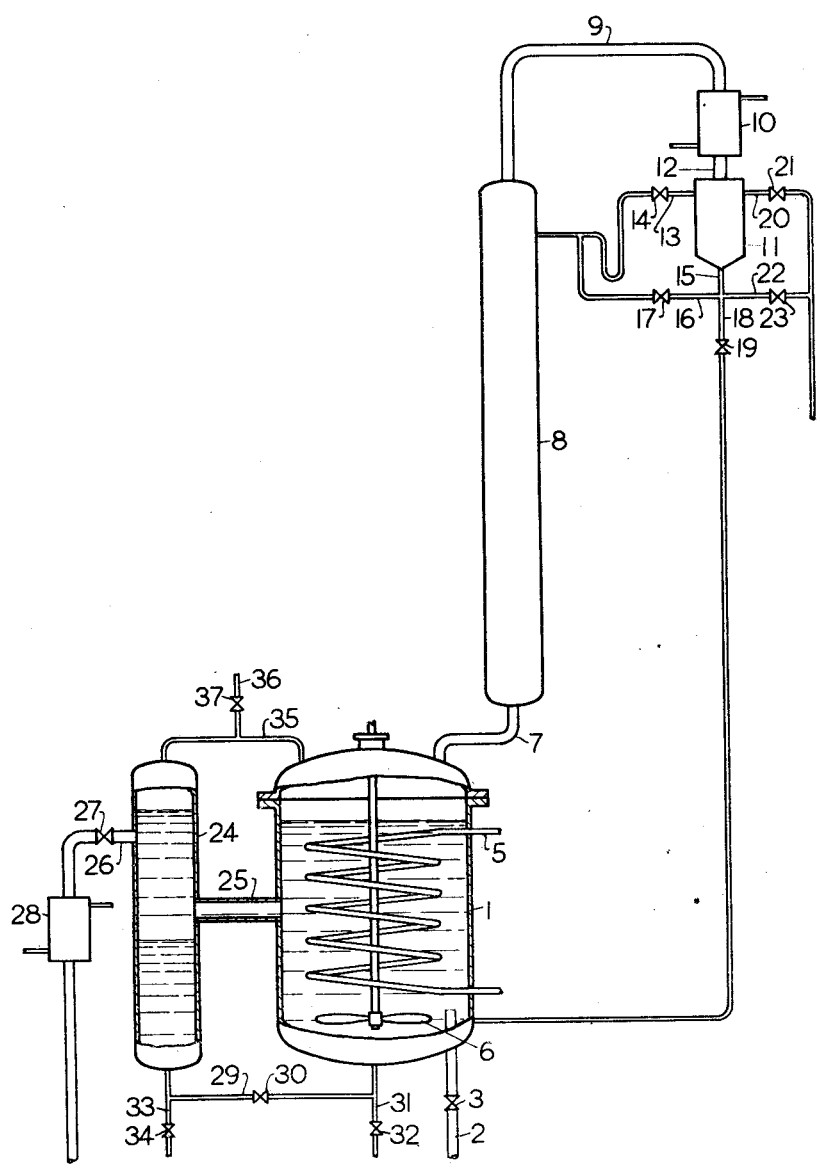
Inventors: Sumner H. McAllister
Vernon E. Haury
By their Attorney:

Patented Feb. 2, 1943

2,309,650

UNITED STATES PATENT OFFICE 2,309,650

CONDENSATION OF CARBONYLIC COMPOUNDS

Sumner H. McAllister, Lafayette, and Vernon E. Haury, El Cerrito, Calif., assignors to Shell Development Company, San Francisco, Calif., a corporation of Delaware Application February 12, 1940, Serial No. 318,506

18 Claims. (Cl. 260—593)

This invention relates to an improved process for condensing carbonylic compounds to unsaturated aldehydes and ketones of greater molecular weight. More particularly, the invention is concerned with a process for condensing aldehydes and/or ketones wherein the reaction conditions are controlled in a manner which enables production of predominating amounts of a desired unsaturated carbonylic compound.

It is an object of the present invention to provide a process which enables carbonylic compounds to be converted directly to unsaturated carbonylic compounds in a single operation without isolation and separation of intermediate aldol-type products which must be subsequently dehydrated in a separate operation to yield unsaturated compounds. Another object is to provide a process which enables the condensation reactions to be controlled so that a desired unsaturated carbonylic compound may be obtained in predominating amounts. A further object is to provide a condensation process which employs a catalyst which has a long, useful life. A still further object of the invention is to provide a process for condensation of carbonylic compounds which is particularly suited to continuous production of unsaturated carbonylic compounds and is therefore attractive for technical-scale, commercial production of products of this type.

It has been known that aldehydes and ketones may be condensed in the presence of strong condensation agents to give unsaturated aldehydes and ketones. The reaction which is involved in this type of condensation involves the combination of two or more molecules of aldehydes or ketones with the simultaneous splitting off of one less number of molecules of water than the number of molecules of carbonylic compounds combining. This reaction is referred to as crotonaldehyde-type condensation by analogy with the reaction which occurs when two molecules of acetaldehyde condense to form a molecule of crotonaldehyde and one of water. In aldol condensation of carbonylic compounds, the molecules combine to form aldols or ketols without water being a product of the reaction. Crotonaldehyde-type condensation is thus distinguished from aldol condensation in that water is formed in the former reaction but not in the latter and also, the carbonylic products from the former are always unsaturated while the products of the latter may or may not be unsaturated, depending upon the presence or absence of unsaturation in the reactants.

In prior processes for crotonaldehyde-type condensation of carbonylic compounds, the water which was evolved by the reactions continually diluted the reaction mixture, especially the catalyst, during the course of the condensation so that the reaction was conducted under conditions which were constantly changing. We have now found that in order to obtain a particular product, it is essential that the reaction conditions be maintained substantially constant throughout the reaction. We have also discovered that an aqueous solution of the condensation agent is a superior and more practical catalyst for crotonaldehyde-type condensation than the solid catalyst proposed by the prior art. The use of solid alkaline catalysts and the removal of the water from the reaction as fast as formed so as to avoid obtaining an aqueous solution of the catalyst has been suggested by the art, but this process has a number of features which make it inferior to the process of the present invention. Resinous materials of high molecular weight are unavoidably formed by the reactions which, when collected upon the surface of the solid catalyst, greatly decrease the activity thereof and permit only a short life. The loose, solid catalyst employed in the known process is also awkward and inconvenient to handle and to remove from the reaction vessel when it becomes inactive. Furthermore, the reaction mixture containing the solid catalyst in a loose form necessitates subjecting the reaction mixture to a filtering operation when removal of the catalyst therefrom is desired.

All of these and other difficulties are avoided in the process of the present invention. According to our invention, a carbonylic compound is subjected to crotonaldehyde-type of condensation at an elevated temperature in the presence of a concentrated aqueous solution of a condensing agent while maintaining the concentration of condensing agent in the aqueous solution substantially constant. By employing an aqueous solution of condensing agent rather than a solid catalyst, the resinous by-products of the reaction cannot collect on the surface of the catalyst and impair or destroy its activity. The catalyst employed in our invention thus has a long useful life which is of prime importance in adaption of the process to technical-scale, commercial production of unsaturated carbonylic compounds. Moreover, by using a concentrated aqueous solution, the catalyst solution and the reaction products exist as two phases which permits ready separation of the products from the catalyst solution and makes possible continuous production of the desired products. One of the most important features of the present invention resides in the control and maintenance of a constant concentration of condensing agent in aqueous solution. Since the character of the products is dependent upon the concentration of catalyst, this allows the optimum concentration of catalyst for a particular product to be chosen and retained during the entire course of the reaction.

The concentration of catalyst is maintained constant by distilling water from the reaction mixture either at a rate equal to its rate of formation or at a more rapid rate with continual return of a sufficient amount of the removed water to keep the catalyst concentration substantially constant. The water, with some reactants, may be distilled from the mixture alone, while with reactants which form an azeotrope with water, an azeotropic mixture may be distilled from the reaction mixture. If desired, extraneous substances which form azeotropes with water may be added to the reaction mixture for the purpose of aiding the removal of water therefrom.

The accompanying semi-diagrammatic drawing shows an apparatus in which a preferred embodiment of our process may be executed. The carbonylic compound or compounds to be condensed are introduced continuously into reaction vessel 1 through pipe 2 and valve 3; the reaction vessel containing an aqueous solution of a condensing agent. The reaction mixture is heated by means of steam coil 5 and agitated with stirrer 6. Water formed by the condensation reaction and possibly water from the aqueous catalyst solution together with any reactant or extraneous substance forming an azeotrope with water is distilled from the reaction mixture and passed through pipe 7 into fractionating column 8. The distilling vapors leave the fractionating column by means of pipe 9 and are condensed in condenser 10 cooled by a suitable medium such as cooling water. The condensed vapors pass into accumulator 11 through pipe 12 which also may act as a phase separator. The accumulator is equipped with several outlets, the use of which are determined by the particular materials being employed. Pipe 13, located at the upper part of the accumulator permits the withdrawal of an upper phase from the accumulator which withdrawn material may pass through valve 14 to column 8 wherein it may be used as reflux. If desired, a lower layer may be withdrawn from the accumulator through pipe 15 and by means of pipe 16 and valve 17, passed to the column for reflux. When phase separation occurs in the accumulator, the lower layer will ordinarily be richer in water than the upper layer. If no phase separation occurs, valve 14 may be closed and reflux supplied entirely by means of pipes 15 and 16, and valve 17. If desired, a part or the entire distillate or lower layer may be returned directly to the reaction vessel with the aid of pipe 18 and valve 19. In some cases it may be desirable to remove a part or all of an upper layer from the system. This may be accomplished through pipe 20 and valve 21. The removal of water from the system is made possible through pipe 22 and valve 23.

Fractionating column 8 may be equipped with bubble plates of conventional design for fractionating operations, or it may be packed with suitable material for obtaining good liquid vapor contact such as carbon rings, raschig rings, etc.

The reaction products together with the reactants are agitated in the reaction vessel with the aqueous solution of catalyst. In order to obtain the products substantially free of the catalyst solution, a separator 24 is connected to the reaction vessel through pipe 25. The reaction products and some unreacted material collect in the separator as an upper layer from which they may be removed continuously through pipe 26 and valve 27 and cooled by means of cooler 28. The lower catalyst layer in separator 24 is connected with the reaction vessel through pipe 29 and valve 30. An outlet pipe 31 provided with valve 32 permits charging and discharging of catalyst solution to and from the reaction vessel while samples of the catalyst solution may be withdrawn through pipe 33 and valve 34 for determining whether the operation of the system is as desired and whether the catalyst concentration is being maintained substantially constant. To avoid a gas buffer in separator 24, compensating pipe 35 connects to the vapor or gas space of the reaction vessel, and a vent pipe 36 and valve 37 are provided.

The process of our invention may be employed for crotonaldehye-type of condensation of any carbonylic compound capable of undergoing this type of reaction. By a "carbonylic compound" reference is made to those compounds containing a carbonyl group such as the aldehydes and ketones. Thus the carbonylic compounds employed in the present invention are not to be confused with related compounds of entirely different chemical properties, namely, carboxylic acids and derivatives thereof such as esters, carboxylic acid anhydrides, halides, amides and the like. In the aldehydes and ketones the carbonyl group is linked directly to either hydrogen atoms, carbon atoms or both, but to no other elements.

Crotonaldehye-type condensation may be effected between like molecules of a ketone by employing a single species of ketone in the reaction mixture. The reaction then is one of self-condensation, but, depending upon the reaction conditions, the starting ketone may also condense to a greater or lesser degree with the products from the primary reaction to form higher unsaturated ketones from combination of three or more molecules of the ketone. A ketone may be condensed with a dissimilar ketone by employing two or more different species of ketones as starting materials. Cross-condensation of the ketones will occur in this case although self-conrdensation of individual constituents will also occur. In a similar manner, a ketone may be condensed with an aldehyde, an aldehyde with a dissimilar aldehyde, or an aldehyde with itself.

The products of the reactions will be dimeric unsaturated carbonylic compounds resulting from crotonaldehyde concentration of two carbonylic molecules, trimeric compounds from combination of three molecules in the reactions, and higher products which may be resinous in character as the molecular weight becomes increasingly greater.

The carbonylic compounds employed in the process may be either saturated or unsaturated compounds and may be aliphatic or cyclic including alicyclic, aromatic or heterocyclic ketones and aldehydes. Suitable ketones include, among others, acetone, methyl ethyl ketone, methyl propyl ketone, diethyl ketone, methyl isobutyl ketone, methyl vinyl ketone, methyl isopropenyl ketone, mesityl oxide, cyclopentanone, cyclohexanone, methyl cyclohexyl ketone, acetophenone and the like and their homologues, anologues and suitable substitution products. Included among the suitable aldehydes are formaldehyde, acetaldehyde, isobutyraldehyde, acrolein, crotonaldehyde, methacrolein, benzaldehyde, cinnamaldehyde and the like, and their homologues, analogues and suitable substitution products. The reactants may contain substituent elements or groups which may be inert under the reaction conditions or may undergo simultaneous change without interfering with the production of the desired condensation products.

The catalyst preferably employed in the process is a concentrated aqueous solution of a strong condensing agent. It is preferred to use a strong base such as a concentrated solution of an alkali metal hydroxide like sodium hydroxide, potassium hydroxide, etc. A concentrated solution of this type of base is one containing from about 35% up to the saturation point of metal hydroxide at the operating temperature of the process. With sodium hydroxide, concentrations of from 50 to 70% are particularly satisfactory. Concentrated solutions of strong acids are also suitable catalysts. There may be used concentrated sulfuric acid in aqueous solution such as 80 to 99% sulfuric acid, or concentrated solutions of other acids such as hydrochloric acid, hydrobromic acid, phosphoric acid, trichloracetic acid, pyrophosphoric acid, chlorosulfonic acid, benzenesulfonic acid and the like. The use of acids which give high concentrations of hydrogen ion, but are also strong oxidizing agents which would destroy reactants and products are, of course, to be avoided. The term "concentrated" is used with the meaning attributed to it by workers in chemical arts as are also the expressions "strong bases" and "strong acids."

The temperature employed in the process may be varied from about 50° to about 200° C., the most suitable temperature being dependent upon the reactivity of the reactant or reactants being condensed, the catalyst employed, the concentration of catalyst in aqueous solution, the contact time of the reactant or reactants with the catalyst solution, and the character of the products desired. Ordinarily, an operating temperature of from 100° C. to 150° C. is preferred. The aldehydes are, in general, more reactive than the ketones and consequently, less drastic conditions may be used to condense these substances. Furthermore, the unsaturated reactants are more easily condensed than the corresponding saturated compounds. Thus mesityl oxide is more reactive than the corresponding methyl isobutyl ketone. While a range of temperatures may be used in the process, it is desirable to maintain at least sufficient pressure on the system so that the primary condensation product will not boil. The conditions of temperature and pressure may be chosen so that the operating temperature is not greater than the boiling point of the primary condensation product at the operating pressure. For the higher ketones and aldehydes, ordinary atmospheric pressure is ample for the usual operating temperatures, but with the lower reactants, it may be desirable to employ superatmospheric pressures.

Other variables which may be adjusted to suit the needs of the reactants and products desired are the contact time and the ratio of reactants to catalyst solution. The effect of longer contact times, is as a rule, the formation of higher condensation products. In some cases contact times of a fraction of an hour will be satisfactory while in others it may be desirable to use contact times of a number of hours. Ordinarily, contact times of from one to five hours are suitable. The ratio of reactants to catalyst solution has a less pronounced effect than the contact time although with other conditions equal, the smaller the ratio, the greater will be the yield of higher condensation products. Ratios within the range of from about 0.5 to about 10 of reactant to one of catalyst solution give excellent results.

Since the excellent results obtained by the process are dependent upon the maintenance of a constant concentration of catalyst in aqueous solution, and since water is one of the products of the reactions, it is necessary to continuously remove water from the reaction mixture. The preferred method of removing the water is by distillation and while this may be done in some cases by simple distillation, azeotropic distillation is a more preferred method. The reactants are convenient substances for use in the azeotropic removal of the water. Thus the ketones, with the exception of acetone, form azeotropes with water and when they are condensed in the process, a sufficient excess may be added to the reaction mixture to enable the water which it is desired to remove to be taken from the mixture as an azeotrope with the ketone. This is a preferred method of removing the water so that the concentration of catalyst in aqueous solution will remain constant. If desired, other inert organic substances which form azeotropes with water may be employed. Suitable materials for this purpose are hydrocarbons such as benzene, toluene, isooctane, naphtha, etc., halogenated hydrocarbons, ethers, alcohols, and the like.

The invention may be more easily understood and its possibilities and value realized by reference to the following examples which are given for illustrative purposes only.

*Example I*

It was desired to condense mesityl oxide continuously and obtain as high a yield as possible of the 12 carbon atom ($C_{12}$) ketone. For this purpose, a 55 per cent aqueous solution of sodium hydroxide was used as catalyst. The catalyst was placed in a reaction vessel fitted with means for withdrawing the organic layer therefrom continuously, and with a fractionating column for removing the water. At the start of the run, about 1200 gm. of catalyst solution and 1500 gm. of mesityl oxide were boiled for about an hour before removal of the reaction products. Then mesityl oxide was continuously fed in, reaction products were continuously withdrawn, and the water formed by the reaction was continuously distilled from the reaction mixture along with some mesityl oxide and with acetone which forms to a small extent as a product of hydrolysis. During a sixteen hour period, about 189.0 mols of mesityl oxide were fed to the reactor and approximately 113.0 mols were recovered unchanged. Of the mesityl oxide which reacted, a yield of 73.5 per cent $C_{12}$ ketone was obtained together with 6.3 per cent acetone and 20.0 per cent $C_{18}$ or higher ketones.

*Example II*

Mesityl oxide was condensed in the same reaction vessel with 55 per cent aqueous sodium hydroxide in a similar manner as in Example I except that the caustic concentration was not controlled and kept constant. Due to the fluctuation of catalyst concentration, the yield of $C_{12}$ ketone in this case amounted to only 54.3 per cent. There was also produced a yield of 7.7 per cent acetone and 28.0 per cent $C_{18}$ or higher ketones.

Example III

Mesityl oxide was condensed in equipment similar to that shown in the accompanying drawing. The catalyst employed was aqueous sodium hydroxide of 56 per cent concentration. Approximately 10 gallons of catalyst solution were in the reaction vessel while the polymer layer was maintained at about 17 gallons. Mesityl oxide was fed to the reactor at a rate of about 6.3 gallons per hour, the product layer being continuously withdrawn from the separator. After leaving the reactor, the product layer was washed with water, centrifuged to separate the aqueous phase from the condensation products, and distilled in vacuo. The sodium hydroxide was maintained at constant concentration by continuously distilling the water formed from the reaction mixture along with some acetone formed in the reactions and some mesityl oxide. This distillate was subsequently redistilled to recover the acetone and mesityl oxide therein. The catalyst concentration was frequently checked by means of a hydrometer.

During the run the temperature of the reaction mixture was kept at about 132° C., while that of the stillhead was about 79° C. A total of about 1312 lbs. of mesityl oxide was fed to the reactor, the average residence time being about 2.7 hours. A total of 970 lbs. of product layer was recovered, while the overhead distillate from the reaction mixture amounted to a total of 327 lbs. The weight per cent composition of the overhead distillate was as follows:

| | Per cent |
|---|---|
| Acetone | 55.7 |
| Water | 16.8 |
| Mesityl oxide | 27.5 |

The weight per cent of the products from the reactor was as follows:

| | Per cent |
|---|---|
| Acetone | 0.8 |
| Mesityl oxide | 13.6 |
| $C_{12}$ unsaturated ketone | 31.8 |
| $C_{18}$ unsaturated ketone | 29.8 |
| $C_{24}$ unsaturated ketone | 12.1 |
| Resin | 12.0 |

Of the mesityl oxide fed to the reactor, about 83.0% was reacted. The yields of the various products calculated as mol per cent of the mesityl oxide which reacted follow:

| | Per cent |
|---|---|
| Acetone | 14.9 |
| $C_{12}$ unsaturated ketone | 33.8 |
| $C_{18}$ unsaturated ketone | 34.3 |
| $C_{24}$ unsaturated ketone | 12.5 |
| Resin | 4.5 |

Example IV

Using about 150 gm. of 96 per cent sulfuric acid as catalyst, about 1500 gm. of mesityl oxide were condensed over a period of approximately 4 hours at a temperature of 50–70° C. The products obtained in grams per 1000 grams of mesityl oxide were acetone 345, $C_{12}$ unsaturated ketone 80, $C_{18}$ unsaturated ketone 71, $C_{24}$ unsaturated ketone 64, and higher than $C_{24}$ unsaturated ketone 255.

Example V

In the apparatus described in Example I, a mixture of about 1940 gm. of 55 per cent aqueous sodium hydroxide and 2460 gm. of $C_{12}$ unsaturated ketone obtained by alkaline condensation of mesityl oxide were heated to 150–155° C. for approximately 1.5 hours with continuous removal of the formed water, acetone and mesityl oxide. The product was then washed and fractionated and about 1650 gm. of $C_{12}$ ketone were recovered unreacted. Of the reacted material, the following products were obtained:

| | Grams |
|---|---|
| Acetone | 61 |
| Mesityl oxide | 1 |
| $C_{18}$ unsaturated ketone | 10 |
| $C_{24}$ unsaturated ketone | 516 |
| $C>_{24}$ unsaturated ketone | 136 |

This experiment indicated that a good yield of $C_{24}$ unsaturated ketone may be obtained by condensing the $C_{12}$ unsaturated ketone. Similarly, the $C_{18}$ unsaturated ketone may be prepared in high yield by condensing a mixture of the $C_{12}$ unsaturated ketone and mesityl oxide.

Mesityl oxide is a preferred substance to condense in the process, the method of the invention being particularly well adapted to the treatment of this reactant. When this ketone is treated the catalyst preferably employed is a 50 to 65 per cent aqueous solution of an alkali metal hydroxide, the condensation reactions are preferably effected at a temperature of from about 120 to 140° C., and the catalyst concentration in aqueous solution is preferably maintained substantially constant throughout the reaction period.

The products of the process are valuable and useful substances. Some are highly unsaturated and capable of being dried and hardened to tough solids. Others may be hydrogenated for use as plasticizers, solvents and resins. The hydrogenation may be sufficiently complete so that alcohols result, from which a variety of products may be prepared by sulfonation, esterification and the like. It is seen that the unsaturated carbonylic compounds are valuable chemical intermediates in numerous syntheses.

We claim as our invention:

1. A process for the production of unsaturated ketone which comprises subjecting mesityl oxide to crotonaldehyde-type of condensation at a temperature of from about 120 to 140° C. in the presence of a concentrated aqueous solution of an alkali metal hydroxide while maintaining the concentration of hydroxide in aqueous solution substantially constant.

2. A process for the production of unsaturated ketones which comprises subjecting mesityl oxide to crotonaldehyde-type of condensation by heating it at a temperature of from about 50° C. to 200° C. in the presence of a concentrated aqueous solution of a strong base while maintaining the concentration of the base in aqueous solution substantially constant.

3. A process for the production of unsaturated oxo compounds which comprises subjecting a methyl ketone to crotonaldehyde-type of condensation by heating the ketone at a temperature of from about 50° C. to 200° C. in the presence of a concentrated aqueous solution of an alkali metal hydroxide while maintaining the concentration of the base in aqueous solution substantially constant.

4. A process for the production of unsaturated oxo compounds which comprises subjecting a ketone to crotonaldehyde-type of condensation by heating the ketone at a temperature of from about 50° C. to 200° C. in the presence of a concentrated aqueous solution of a strong base while maintaining the concentration of the base in aqueous solution substantially constant.

5. A process for the production of unsaturated ketones which comprises subjecting mesityl oxide to crotonaldehyde-type of condensation by continuously introducing mesityle oxide into and heating it with a concentrated aqueous solution of an alkali metal hydroxide at a temperature between about 120° C. to 140° C. continuously removing condensation products from the reaction mixture, and continuously distilling a mixture containing water and mesityl oxide from the reaction mixture at a rate which will maintain the concentration of the hydroxide in aqueous solution substantially constant.

6. A process for the production of unsaturated ketones which comprises subjecting mesityl oxide to crotonaldehyde-type of condensation by continuously introducing the mesityl oxide into a heated, concentrated aqueous solution of a strong base, continuously withdrawing condensation products from the reaction mixture and continuously distilling a mixture containing water and mesityl oxide from the reaction mixture at a rate which will maintain the concentration of the base in aqueous solution substantially constant.

7. A process for the production of unsaturated ketones which comprises subjecting a ketone to crotonaldehyde-type of condensation by continuously introducing the ketone into a heated concentrated aqueous solution of a strong base, continuously withdrawing condensation products from the reaction mixture and continuously distilling water from the reaction mixture so as to maintain the concentration of he base in aqueous solution substantially constant.

8. A process for the production of unsaturated ketones which comprises subjecting mesityl oxide to crotonaldehyde-type of condensation by heating the mesityl oxide with a concentrated aqueous solution of an alkali metal hydroxide and distilling a mixture containing water and mesityl oxide from the reaction mixture at a rate which will maintain the concentration of the hydroxide in aqueous solution substantially constant.

9. A process for the production of unsaturated ketones which comprises subjecting a ketone containing at least 4 carbon atoms to crotonaldehyde-type of condensation by heating the ketone with a concentrated solution of a strong base and distilling a mixture of water and said ketone from the reaction mixture at a rate sufficient to maintain the concentration of the base in aqueous solution substantially constant.

10. A process for the production of unsaturated ketones which comprises subjecting a ketone to crotonaldehyde-type of condensation by heating the ketone at a temperature above about 50° C. but below the boiling point, at the prevailing pressure, of the lowest boiling condensation product with a concentrated aqueous solution of a strong base and distilling water from the reaction mixture at such a rate that the concentration of the base in aqueous solution is maintained substantially constant.

11. A process for the production of unsaturated oxo compounds which comprises subjecting a methyl ketone to crotonaldehyde-type of condensation by heating the ketone at a temperature of from about 50° C. to 200° C. with an aqueous solution containing from about 80 to 99 per cent sulfuric acid while maintaining the concentration of sulfuric acid in aqueous solution substantially constant.

12. A process for the production of unsaturated oxo compounds which comprises subjecting a ketone to crotonaldehyde-type of condensation by heating the ketone at a temperature of from about 50° C. to 200° C. in the presence of a concentrated aqueous solution of a strong acid while maintaining the concentration of the acid in aqueous solution substantially constant.

13. A process for the production of unsaturated oxo compounds which comprises subjecting an aldehyde to crotonaldehyde-type of condensation by heating the aldehyde at a temperature of from about 50° C. to 200° C. in the presence of a concentrated aqueous solution of a strong base while maintaining the concentration of the base in aqueous solution substantially constant.

14. A process for the production of unsaturated oxo compounds which comprises subjecting an aldehyde to crotonaldehyde-type of condensation by heating the aldehyde at a temperature of from about 50° C. to 200° C. in the presence of a concentrated aqueous solution of a strong condensing agent while maintaining the concentration of the condensing agent in aqueous solution substantially constant.

15. A process for the production of unsaturated oxo compounds which comprises subjecting a carbonylic compound from the group consisting of the ketones and the aldehydes to crotonaldehyde-type of condensation by heating the compound at a temperature of from about 50° C. to 200° C. in the presence of a concentrated aqueous solution of a strong condensing agent while maintaining the concentration of the condensing agent in aqueous solution substantially constant.

16. A process which comprises subjecting acetone to crotonaldehyde-type of condensation by heating the acetone at a temperature of from about 50° C. to 200° C. in the presence of an aqueous solution of an alkali metal hydroxide containing at least 35 per cent of the hydroxide while maintaining the concentration of hydroxide in aqueous solution substantially constant.

17. A process which comprises subjecting acetone to crotonaldehyde-type of condensation by heating the acetone at a temperature of from 50° C. to 200° C. in the presence of an aqueous solution of sodium hydroxide containing at least 35 per cent sodium hydroxide while maintaining the concentration of sodium hydroxide in aqueous solution substantially constant.

18. A process which comprises subjecting acetone to crotonaldehyde-type of condensation by heating the acetone at a temperature of from about 50° C. to 200° C. in the presence of an aqueous solution of sodium hydroxide containing a concentration of sodium hydroxide from 50 to 70 per cent while maintaining the concentration of sodium hydroxide in aqueous solution substantially constant.

SUMNER H. McALLISTER.
VERNON E. HAURY.